United States Patent Office 3,361,581
Patented Jan. 2, 1968

3,361,581
SILVER POLISH WITH ANTI-TARNISH AGENT
Rolf Drescher, Haan, Rhineland, Germany, assignor to American Home Products Corporation, New York, N.Y., a corporation of Delaware
No Drawing. Filed July 6, 1965, Ser. No. 469,860
6 Claims. (Cl. 106—11)

ABSTRACT OF THE DISCLOSURE

Tarnish-inhibiting silver polishes are disclosed which comprise suspensions of abrasive powder in an aqueous medium containing a suspending agent and a cyclic thiol from the group consisting of 5-mercaptotetrazole, 5-mercapto-1,3,4-thiadiazole, thio-$\beta$-naphthol, and 2-mercaptopyrimidine.

---

This invention relates to a silver polish containing certain anti-tarnish agents and an abrasive.

The main object of this invention is to provide a composition of the character described which will polish silver and prevent its retarnishing on exposure to air.

The compositions whereby the foregoing object is attained comprise: from about 0.5 to about 20% by volume of a suspending agent or wetting agent, preferably, a fatty acid diethanolamide; from about 2.5 to about 50% of an abrasive such as alumina; from about 0.25 to about 30% of the anti-tarnish agent; from about 1.25 to 30% of a petroleum distillate such as white spirit or kerosene; from about 0.05 to 0.5% by volume of perfume concentrate, the balance distilled, demineralized or other soft water.

The abrasive employed in the present composition can be any known abrasive substance capable of polishing silver when used in finely divided form such as alumina, silica and chalk.

In order to mask the odor of the compositions or to give them any desired aroma a small amount of perfume concentrate can be used.

The preferred anti-tarnish agents found suitable for the claimed compositions are 5-mercapto-tetrazole, 5-mercapto-1,3,4-thiodiazole, thio-$\beta$-naphthole and 2-mercaptopyrimidine.

Suitable suspending and/or wetting agents include fatty acid diethanolamides and alkyl-aryl sulfonate water-soluble ethoxilated fatty alcohols etc. or Bentonite or mixtures of it.

Any water-soluble suspending agent and wetting agent can be used. Fatty acid diethanolamide serve for making water-soluble the anti-tarnish agents (probably a complex is formed) and as wetting and suspending agent. For example one can use a water-soluble ethoxilated fatty alcohol together with fatty acid diethanolamide or a combination of alkyl-aryl sulfonates with fatty acid diethanolamides or fatty alcohol sulfates. Bentonite or carboxymethylcellulose can also be used in combination with fatty acid diethanolamides.

The claimed compositions are prepared by heating with stirring a solution mixture of the anti-tarnish agent, water and the suspending or wetting agent. The temperature of the solution is kept at 80 to 90° C. and stirring is continued until all the solid dissolves. The resulting solution then is cooled to about 20° C. White spirit (a petroleum distillate having a boiling point curve in the range of 145 to 200° C. and specific gravity of 0.775) and/or kerosene (commercial or deodorized), perfume and abrasive are next added and the solution is stirred for about ¼ to ½ hour until a smooth solution is obtained.

The compositions are applied conventionally on the silver articles to be treated by rubbing about 1.5 g. thereof per 75 sq. in. of surface area. Their efficacy was tested by exposing to hydrogen sulfide for ½ hour–1 hour silver articles half of whose surfaces had been treated with the selected composition and the other half of which was untreated. The treated area in each case did not tarnish whereas the untreated area rapidly tarnished during exposure to hydrogen sulfide fumes.

Preferred compositions according to the present invention are the following:

EXAMPLE 1

| | Percent |
|---|---|
| Coconut fatty acid diethanolamide | 10.00 |
| Water (distilled or demineralized) | 79.75 |
| 5-mercaptotetrazole | 2.50 |
| Perfume | 0.25 |
| Alumina ($Al_2O_3$) size of grain about 10–15 microns | 5.00 |
| White spirit | 2.50 |
| | 100.00 |

EXAMPLE 2

| | Percent |
|---|---|
| Coconut fatty acid diethanolamide | 10.00 |
| Water (distilled or demineralized) | 79.75 |
| 5-mercapto-1,3,4-thiodiazole | 2.50 |
| Perfume | 0.25 |
| Alumina ($Al_2O_3$) size of grain about 10–15 microns | 5.00 |
| White spirit | 2.50 |
| | 100.00 |

EXAMPLE 3

| | Percent |
|---|---|
| Coconut fatty acid diethanolamide | 10.00 |
| Water (distilled or demineralized) | 79.75 |
| Thio-$\beta$-naphthole | 2.50 |
| Perfume | 0.25 |
| Alumina ($Al_2O_3$) size of grain about 10–15 microns | 5.00 |
| White spirit | 2.50 |
| | 100.00 |

EXAMPLE 4

| | Percent |
|---|---|
| Coconut fatty acid diethanolamide | 10.00 |
| Water (distilled or demineralized) | 79.75 |
| 2-mercapto-pyrimidine | 2.50 |
| Perfume | 0.25 |
| Alumina ($Al_2O_3$) size of grain about 10–15 microns | 5.00 |
| White spirit | 2.50 |
| | 100.00 |

Various changes and modifications of the invention can be made by those skilled in the art to which it relates and to the extent that such variations incorporate the concepts of the invention. They are included in the scope of the claims. Thus it will be realized by those skilled in the art that the essential components of the present invention are the abrasive and the anti-tarnishing agents so that the other components can be varied extensively in kind and quantity.

What I claim is:
1. A silver polish comprising water, a surfactant, an abrasive powder and an anti-tarnish agent selected from the group consisting of 5-mercapto-tetrazole, 5-mercapto-1,3,4-thiodiazole, thio-$\beta$-naphthol and 2-mercapto-pyrimidine.

2. A silver polish composition consisting of from about 5 to about 50% of an abrasive; from about 0.25 to about 30% of an anti-tarnish agent selected from the group consisting of 5-mercapto-tetrazole, 5-mercapto-1,3,4-thiodiazole, thio-β-naphthole and 2-mercapto-pyrimidine; from about 0.5 to 20% of a suspending agent; from about 1.25 to 30% of a petroleum distillate; from about 0.05 to 0.5% by volume of perfume concentrate, the balance water.

3. A composition according to claim 1 in which the anti-tarnish agent is 5-mercaptotetrazole.

4. A composition according ot claim 1 in which the anti-tarnish agent is 5-mercapto-1,3,4-thiadiazole.

5. A composition according to claim 1 in which the anti-tarnish agent is thio-β-naphthol.

6. A composition according to claim 1 in which the anti-tarnish agent is 2-mercaptopyrimidine.

References Cited

UNITED STATES PATENTS

| | | | |
|---|---|---|---|
| 2,618,603 | 11/1952 | Schaeffer | 106—14 X |
| 2,703,785 | 3/1955 | Roberts et al. | 106—14 X |
| 2,708,660 | 5/1955 | Jolly. | |
| 3,117,012 | 1/1964 | Aler et al. | 106—8 |

ALEXANDER H. BRODMERKEL, *Primary Examiner.*

J. B. EVANS, *Assistant Examiner.*